(12) United States Patent
Niihara et al.

(10) Patent No.: US 8,593,651 B2
(45) Date of Patent: Nov. 26, 2013

(54) IMAGE FORMING APPARATUS WITH SHORTENED CONVEYANCE PATH OF SHEET ROLL

(75) Inventors: Takayuki Niihara, Kanagawa (JP);
Masahiko Yamada, Tokyo (JP);
Yuichiro Maeyama, Tokyo (JP);
Masato Ogawa, Kanagawa (JP);
Shigeru Morinaga, Kanagawa (JP);
Kazuhiro Wakamatsu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 295 days.

(21) Appl. No.: 12/929,933

(22) Filed: Feb. 25, 2011

(65) Prior Publication Data
US 2011/0211210 A1    Sep. 1, 2011

(30) Foreign Application Priority Data
Mar. 1, 2010    (JP) ................................. 2010-044483

(51) Int. Cl.
*G06K 15/00*    (2006.01)

(52) U.S. Cl.
USPC .......... 358/1.12; 358/471; 347/262; 399/385; 399/107; 399/405; 242/570; 242/560; 242/615

(58) Field of Classification Search
USPC ................. 358/471, 1.12; 399/385, 107, 405; 242/570, 560, 615.3; 347/262
See application file for complete search history.

(56) References Cited

U.S. PATENT DOCUMENTS

| | | | | |
|---|---|---|---|---|
| 5,267,704 A | * | 12/1993 | Kitamura et al. | ............. 242/570 |
| 2005/0175372 A1 | * | 8/2005 | Kunugi | ......................... 399/107 |
| 2011/0064497 A1 | | 3/2011 | Niihara et al. | |

FOREIGN PATENT DOCUMENTS

| JP | 02-130174 A | 5/1990 |
|---|---|---|
| JP | 09-175713 A | 7/1997 |
| JP | 2000071533 A | 3/2000 |
| JP | 2007261086 A | 10/2007 |
| JP | 2007261754 A | 10/2007 |

OTHER PUBLICATIONS

Ishii Takayuki, Medium Conveyance Device and Recording Device, 20050414, JP 2005096987 A.*

* cited by examiner

*Primary Examiner* — Qian Yang
*Assistant Examiner* — Martin Mushambo
(74) *Attorney, Agent, or Firm* — Harness, Dickey & Pierce, P.L.C.

(57) ABSTRACT

An image forming apparatus including an image reading unit disposed in an upper portion of the image forming apparatus, an image forming unit disposed below the image reading unit to form an image on a sheet fed from a sheet roll, a pair of flange members attached to both lateral ends of the sheet roll in a width direction of the sheet roll, a sheet roll supporter disposed below the image reading unit in a rear portion of the image forming apparatus to support the sheet roll, an opening through which the sheet roll is set to the sheet roll supporter, and a guide assembly provided at upper and lower parts of the opening to position at least one of the pair of flange members attached to the sheet roll in the width direction to guide the sheet roll to the sheet roll supporter.

20 Claims, 12 Drawing Sheets

IMAGE FORMING APPARATUS WITH SHORTENED CONVEYANCE PATH OF SHEET ROLL

The present patent application claims priority from Japanese Patent Application No. 2010-044483, filed on Mar. 1, 2010, in the Japan Patent Office, which is hereby incorporated herein by reference in its entirety.

BACKGROUND

1. Technical Field

Illustrative embodiments described in this patent specification generally relate to an image forming apparatus that forms images on a sheet fed from a sheet roll, and more particularly, to an image forming apparatus including an image reading unit and an image forming unit that forms images on a sheet fed from a sheet roll using an inkjet recording system, an electrophotographic system, or the like, to facilitate setting of the sheet roll on a sheet roll supporter through a pair of flange members.

2. Description of the Related Art

Image forming apparatuses are known that feed a sheet from a sheet roll, constituted as one long continuous sheet wound around a core, to an image forming unit to form an image on the sheet. Examples of such image forming apparatuses include large-scale copiers, printers, plotters, and so forth, which are mainly used for drawing figures.

A sheet roll storage unit that supports the sheet roll is often disposed at an upper portion on the back of the image forming apparatus, so that the sheet having an image thereon is discharged directly to the front of the image forming apparatus. Accordingly, a user can visually confirm the sheet discharged from the image forming apparatus and easily retrieve the sheet from a front side of the image forming apparatus. Also, the user can easily supply a new sheet roll or fix sheet jams from the front side of the image forming apparatus. In addition, peripheral equipment such as an automatic take-up unit and a stacker to which the sheet is discharged from the image forming apparatus can be easily connected to the image forming apparatus from the front of the image forming apparatus. Further, a conveyance path of the sheet within the image forming apparatus can be shortened, thereby reducing production costs.

In order to meet recent marketing needs, the image forming apparatus is often provided with an image reading unit disposed at the top of the image forming apparatus. For example, a stand or the like is used for supporting the image reading unit at the top of the image forming apparatus, and the image forming apparatus is accommodated within the stand. However, because the image reading unit is disposed at the top of the image forming apparatus, the sheet roll cannot be set in the image forming apparatus from the top thereof.

Consequently the image forming apparatus must be drawn forward from the stand to visually confirm a position of the sheet roll storage unit at the back of the image forming apparatus to set the sheet roll therein. Further, the user has to squat down to have a clear view of a target position to appropriately set the sheet roll in the sheet roll storage unit, thus imposing an added burden.

SUMMARY

In view of the foregoing, illustrative embodiments described herein provide an improved image forming apparatus including an image reading unit disposed at the top thereof, an image forming unit disposed below the image reading unit, and a sheet roll supporter disposed below the image reading unit on the back of the image forming apparatus. The image forming apparatus further includes an opening formed in a front surface thereof between the image reading unit and the image forming unit. A sheet roll is set on or removed from the sheet roll supporter through the opening. A pair of guide members is disposed at upper and lower parts of the opening to engage at least one of a pair of flange members attached to both ends of the sheet roll so that the sheet roll is positioned laterally, in a width direction thereof. As a result, the sheet roll can be easily set on the sheet roll supporter with good visibility.

At least one embodiment provides an image forming apparatus including an image reading unit disposed in an upper portion of the image forming apparatus to read an image of a document, an image forming unit disposed below the image reading unit to form the image on a sheet fed from a sheet roll formed of a single continuous sheet, a pair of flange members attached to both lateral ends of the sheet roll in a width direction of the sheet roll perpendicular to a direction in which the sheet is fed from the sheet roll to the image forming unit, a sheet roll supporter to support the sheet roll to feed the sheet from the sheet roll to the image forming unit, an opening through which the sheet roll with the pair of flange members attached is set to the sheet roll supporter, and a guide assembly provided at upper and lower parts of the opening. The sheet roll supporter is disposed below the image reading unit in a rear portion of the image forming apparatus, and the opening is formed in a front portion of the image forming apparatus between the image reading unit and the image forming unit. The guide assembly positions at least one of the pair of flange members attached to the sheet roll in the width direction to guide the sheet roll to the sheet roll supporter.

At least one embodiment provides an image forming apparatus including a stand, an image reading unit disposed on the stand to read an image of a document, an image forming unit disposed below the stand to form the image on a sheet fed from a sheet roll formed of a single continuous sheet, a pair of flange members attached to both lateral ends of the sheet roll in a width direction of the sheet roll perpendicular to a direction in which the sheet is fed from the sheet roll to the image forming unit, a sheet roll supporter to support the sheet roll to feed the sheet from the sheet roll to the image forming unit, an opening through which the sheet roll with the pair of flange members attached is set to the sheet roll supporter, and a guide assembly provided to the stand to position at least one of the pair of flange members attached to the sheet roll in the width direction to guide the sheet roll to the sheet roll supporter. The sheet roll supporter is disposed below the image reading unit in a rear portion of the image forming apparatus, and the opening is formed in a front portion of the image forming apparatus between the stand and the image forming unit.

Additional features and advantages of the illustrative embodiments will be more fully apparent from the following detailed description, the accompanying drawings, and the associated claims.

BRIEF DESCRIPTION OF THE DRAWINGS

A more complete appreciation of the illustrative embodiments described herein and the many attendant advantages thereof will be readily obtained as the same becomes better understood by reference to the following detailed description when considered in connection with the accompanying drawings, wherein.

Figure 1:
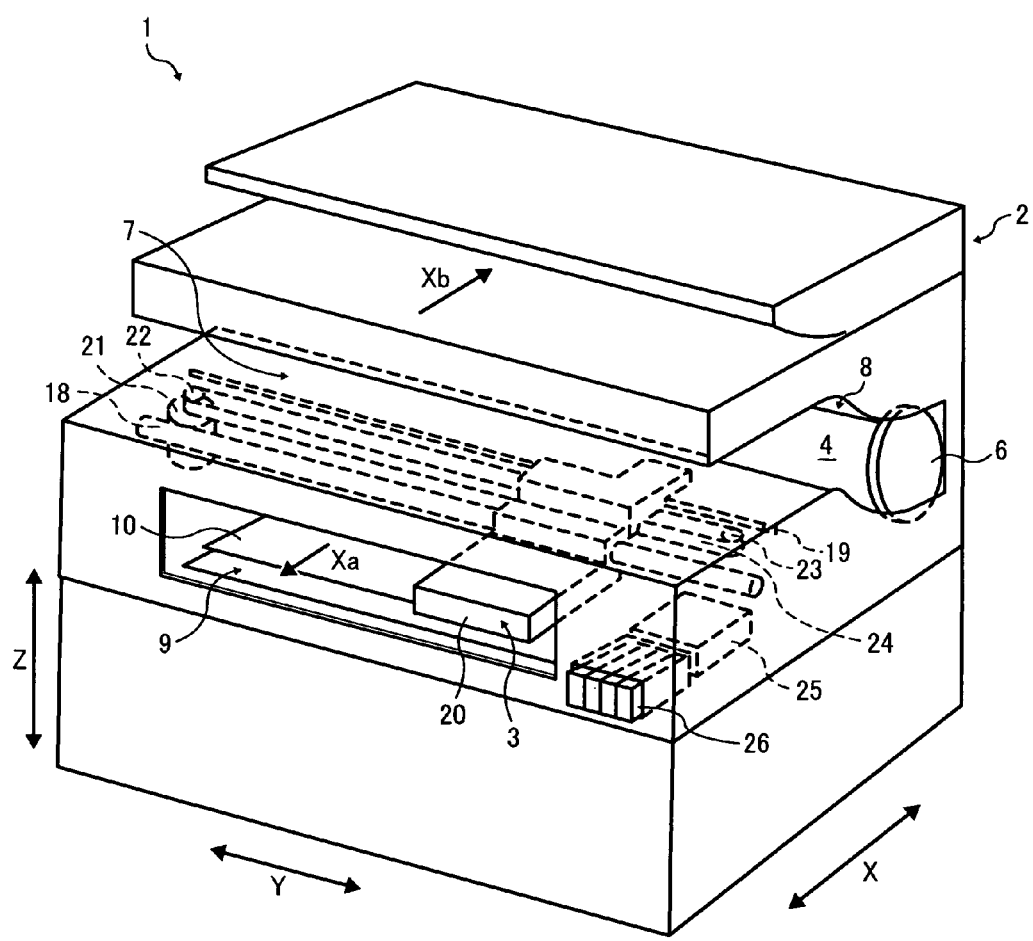
FIG. 1 is a perspective view illustrating an example of an overall configuration of an image forming apparatus according to a first illustrative embodiment.

The accompanying drawings are intended to depict illustrative embodiments and should not be interpreted to limit the scope thereof. The accompanying drawings are not to be considered as drawn to scale unless explicitly noted.

DETAILED DESCRIPTION OF ILLUSTRATIVE EMBODIMENTS

In describing illustrative embodiments illustrated in the drawings, specific terminology is employed for the sake of clarity. However, the disclosure of this specification is not intended to be limited to the specific terminology so selected, and it is to be understood that each specific element includes all technical equivalents that operate in a similar manner and achieve a similar result.

A description is now given of illustrative embodiments of the present invention with reference to drawings, wherein like reference numerals designate identical or corresponding parts throughout the several views.

A configuration and operation of a serial-type inkjet recording device serving as an image forming apparatus 1 according to a first illustrative embodiment are described in detail below, with initial reference to FIGS. 1 and 2.

FIG. 1 is a perspective view illustrating an example of an overall configuration of the image forming apparatus 1 according to the first illustrative embodiment. FIG. 2 is a vertical cross-sectional view illustrating the configuration of the image forming apparatus 1 illustrated in FIG. 1.

Figure 2:
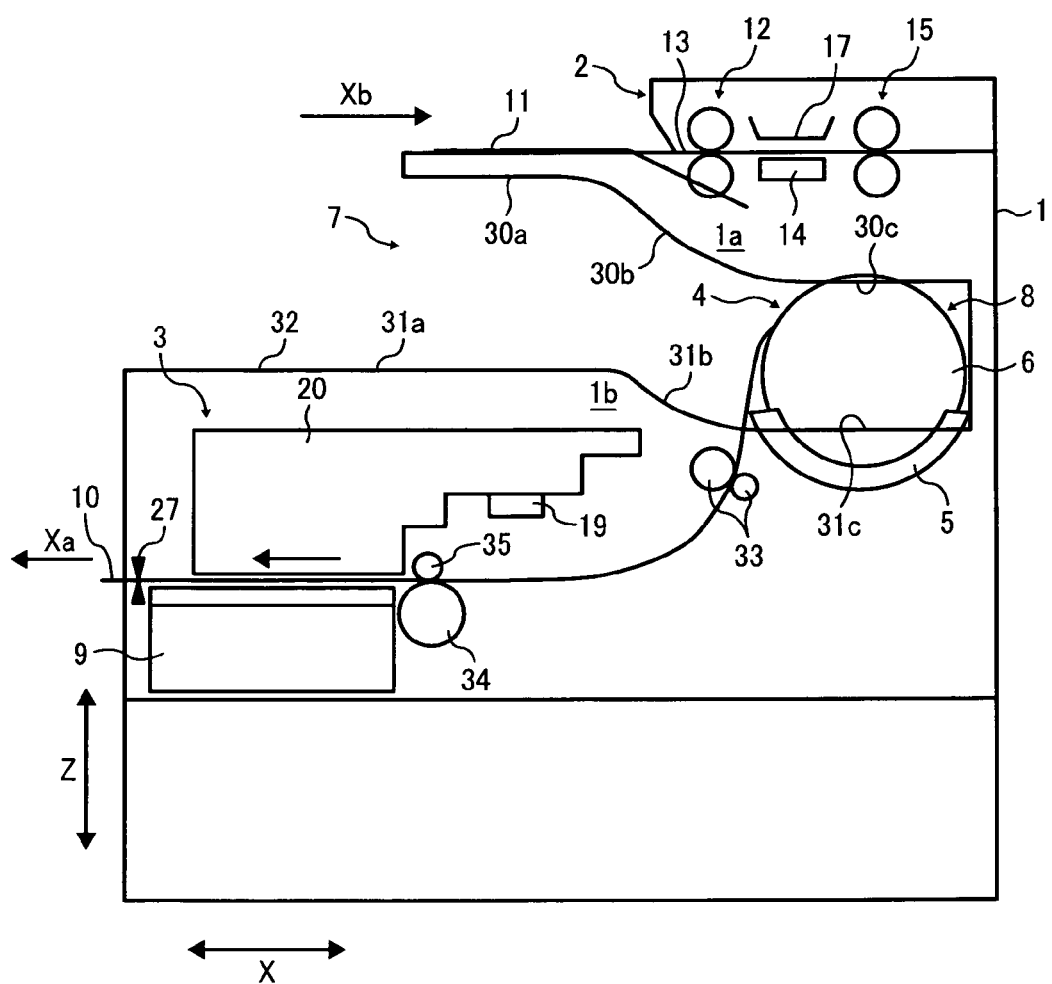
FIG. 2 is a vertical cross-sectional view illustrating the configuration of the image forming apparatus illustrated in FIG. 1.

It is to be noted that, a top and bottom direction of the image forming apparatus 1 is hereinafter referred to as a vertical direction Z as shown in FIGS. 1 and 2, and a horizontal direction perpendicular to the vertical direction Z is a front and back direction X of the image forming apparatus 1. Specifically, the front of the image forming apparatus 1 is shown on the left, and the back of the image forming apparatus 1 is shown on the right in FIGS. 1 and 2. A direction perpendicular to both of the vertical direction Z and the front and back direction X is a main scanning direction Y shown in FIG. 1. The main scanning direction Y is equal to a width direction of a sheet roll 4 or a sheet 10, and is also referred to as a width direction Y.

The image forming apparatus 1 includes an image reading unit 2 provided at the top thereof, an image forming unit 3, a sheet roll storage unit 8, a sheet conveyance unit 9 disposed below the image forming unit 3, and so forth. An opening 7 through which the sheet roll 4 is supplied to the sheet roll storage unit 8 is formed between the image reading unit 2 and the image forming unit 3 on a front surface of the image forming apparatus 1.

The image reading unit 2 reads an image of a document set on a document stand 11. The image reading unit 2 further includes a pair of document feed rollers 12 serving as a document conveyance unit to convey the document set on the document stand 11 to an image reading position from the front to the back of the image forming apparatus 1 as indicated by an arrow Xb in FIGS. 1 and 2, a contact image sensor 14 serving as an image reader provided at the image reading position to read the image of the document, a pair of document discharge rollers 15 serving as a document discharger to discharge the document after the image of the document is read, and a document discharge stand, not shown, to stack the document discharged by the pair of document discharge rollers 15.

The document set on the document stand 11 is conveyed sheet by sheet (if the document consists of multiple sheets) by the pair of document feed rollers 12 through a document conveyance path 13. An image of the document thus conveyed is read by the contact image sensor 14 provided at the image reading position within the document conveyance path 13. After the image is read by the contact image sensor 14, the document is discharged to the document discharge stand by the pair of document discharge rollers 15.

The contact image sensor 14 extends over a substantial part of the width of the image forming apparatus 1, that is, in the main scanning direction Y (or the width direction Y), and includes a light source to direct light onto the document and an image sensor. Specifically, the light source of the contact image sensor 14 directs light onto the document conveyed through the document conveyance path 13 to focus the light reflected from the document on the image sensor through a lens array or the like. Thereafter, the light thus focused is photoelectrically converted into an image signal. The image reading unit 2 further includes a pressing plate 17 positioned opposite a contact glass, not shown, that forms a part of the document conveyance path 13, and above the contact image sensor 14. The pressing plate 17 presses the document toward the contact glass, and serves also as a white reference plate.

The image forming unit 3 employs an inkjet recording system to form images on the sheet 10 conveyed as a recording medium. As illustrated in FIG. 1, the image forming unit 3 includes a guide rod 18 and a guide rail 19 each extended across right and left plates of the image forming unit 3. The guide rod 18 and the guide rail 19 slidably hold a carriage 20 movable in the main scanning direction Y.

The carriage 20 includes liquid ejection heads, not shown, each serving as a recording head. Each of the recording heads ejects ink droplets of a specific color, that is, black (K), yellow (Y), magenta (M), or cyan (C), and includes a sub-tank, not shown, integrally formed therewith to supply ink of the specified color to the recording heads. The ink droplets are ejected downward from the recording heads in the carriage 20.

A main scanning mechanism that scans the carriage 20 in the main scanning direction Y includes: a drive motor 21 provided at one end of the image forming unit 3 in the main scanning direction Y, that is, the left in FIG. 1; a drive pulley 22 connected to an output shaft of the drive motor 21 to be rotatively driven by the drive motor 21; a driven pulley 23 provided at the other end of the image forming unit 3 in the main scanning direction Y, that is, the right in FIG. 1; and a belt member 24 wound around the drive pulley 22 and the driven pulley 23. A tension spring, not shown, applies tension to the driven pulley 23 outward, that is, in a direction away from the drive pulley 22. A part of the belt member 24 is fixed to a mount, not shown, provided on a back surface of the carriage 20 to pull the carriage 20 in the main scanning direction Y.

An encoder sheet, not shown, is provided along the main scanning direction Y of the carriage 20 to detect a main scanning position of the carriage 20. The encoder sheet is read by an encoder sensor, not shown, provided on the carriage 20. The carriage 20 has a main scanning range through which it scans, and within this range is a recording range. The sheet 10 fed from the sheet roll 4 set in the sheet roll storage unit 8 is intermittently conveyed to the recording range by the sheet conveyance unit 9 in a sub-scanning direction perpendicular to the main scanning direction Y to the front of the image forming apparatus 1 as indicated by an arrow Xa in FIGS. 1 and 2.

A maintenance mechanism 25 that performs maintenance and recovery of the recording heads is provided at one end of the image forming apparatus 1 in the main scanning direction Y within the main scanning range of the carriage 20. An ink cartridge 26 that stores ink of the specified color, that is, black (K), yellow (Y), magenta (M), or cyan (C), to be supplied to the sub-tanks included in the recording heads of the carriage 20 is detachably attached to the image forming apparatus 1 at the one end of the image forming apparatus 1 in the main scanning direction Y, that is, a portion outside the main scanning range of the carriage 20.

A cutter 27 that cuts the sheet 10 to a predetermined length is provided in front of a discharge exit of the sheet 10 in the image forming unit 3 in a direction of conveyance of the sheet 10. It is to be noted that a well-known cutter may be used as . the cutter 27. For example, the cutter 27 is fixed to a wire wound around multiple pulleys. The wire is moved in the main scanning direction Y by the drive motor 21 via one of the multiple pulleys connected to the drive motor 21 so that the sheet 10 is cut to the predetermined length by the cutter 27.

The image forming apparatus 1 according to the first illustrative embodiment employs a flange-type sheet roll feed system. It is to be noted that, alternatively, a spool-type sheet roll feed system described in detail later may be employed in the image forming apparatus 1.

The sheet roll storage unit 8 includes flange bearings 5 each serving as a sheet roll supporter that supports the sheet roll 4 such that the sheet 10 is fed from the sheet roll 4.

The sheet roll 4 is set on the flange bearings 5 through flange members 6. Sheet rolls of different types and different widths can be set on the flange bearings 5. For example, the flange bearings 5 are adjustable so as to be able to accommodate sheet rolls of various widths including a large size such as A0 and sizes shown in FIGS. 8 and 10 described later. Examples of the types of the sheet rolls include glossy sheets, plain sheets, and so forth.

Figure 3A:
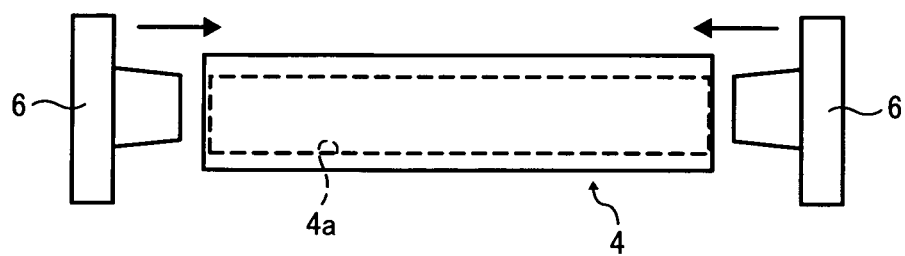
FIGS. 3A and 3B are schematic views respectively illustrating attachment of flange members to a sheet roll.
Figure 3B:
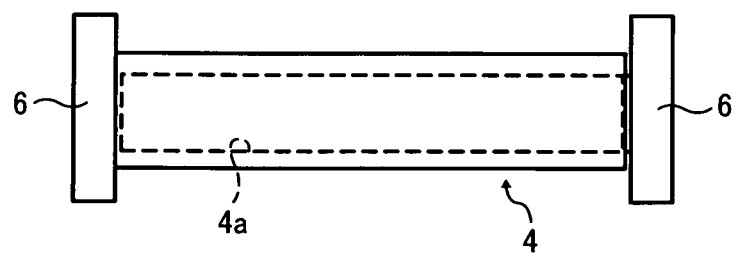

In general, the sheet roll 4 is composed of a paper core 4a made of cardboard or the like and a single long sheet of paper wound around the paper core 4a as shown in FIGS. 3A and 3B. It is to be noted that, the paper core 4a is shown only in FIGS. 3A, 3B, and 9A, and is omitted in the rest of the drawings for ease of illustration.

A description is now given of the procedures for attaching the flange members 6 to both ends of the paper core 4a of the sheet roll 4 with reference to FIGS. 3A and 3B. FIGS. 3A and 3B are schematic views respectively illustrating attachment of the flange members 6 to the both ends of the paper core 4a of the sheet roll 4.

As illustrated in FIG. 3A, first, the flange members 6 are attached to the both ends of the paper core 4a of the sheet roll 4, respectively. At this time, it is important to insert the flange members 6 straight into the both ends of the paper core 4a of the sheet roll 4 until the flange members 6 contact the both ends of the paper core 4a, respectively. Thereafter, the flange members 6 completely attached to the both ends of the paper core 4a of the sheet roll 4 as illustrated in FIG. 3B are placed on the flange bearings 5, respectively, to set the sheet roll 4 on the flange bearings 5.

With regard to the sheet rolls, in addition to various types of paper, the paper core 4a of the sheet roll 4 may have various diameters including generally used sizes such as 2 inches and 3 inches. Either flange members dedicated for each diameter of the paper core 4a or size-variable flange members may be attached to the both ends of the paper core 4a of the sheet roll 4. In the size-variable flange members, an outer diameter of a smaller leading end thereof to be inserted into each end of the paper core 4a can be changed depending on the diameter of the paper core 4a.

When the sheet roll 4 is placed on the flange bearings 5 via the flange members 6, support rollers 48 provided to the flange bearings 5 contact outer circumferential surfaces of the flange members 6, thereby rotating the flange members 6 to feed the sheet 10 from the sheet roll 4. At this time, a rotary shaft of the sheet roll 4 is automatically centered.

Operation of the image forming apparatus 1 having the above-described configuration is described in detail below, again with reference to FIGS. 1 and 2. As described previously, the sheet roll 4 is set on the flange bearings 5 through the flange members 6. A leading edge of the sheet 10 is set to be fed from the sheet roll 4 by a pair of conveyance rollers 33.

The user places the document, not shown, on the document stand 11 of the image reading unit 2 and operates keys on an operation unit, not shown, provided near the image reading unit 2 so that certain image forming conditions are set.

Specifically, selection of a full-color mode or a monochrome mode, the number of sheets to form images, and so forth, are set as the image forming conditions. A signal including such image forming conditions is input to a control unit, not shown, to drive the image forming apparatus 1 so that the image reading unit 2 reads an image of the document, and the contact image sensor 14 outputs an image signal to form the image.

When the pair of conveyance rollers 33 is rotated upon startup of drive means such as a motor, not shown, the flange members 6 placed on the flange bearings 5 are rotated to feed the sheet 10 from the sheet roll 4. The sheet 10 fed from the sheet roll 4 by the pair of conveyance rollers 33 is conveyed through a sheet conveyance path from the back to the front of the image forming apparatus 1 by a conveyance unit such as a drive roller 34 and a driven roller 35, to the recording range in the image forming unit 3. In the image forming unit 3, the carriage 20 is moved in the main scanning direction Y and drives the recording heads to eject liquid droplets based on image data while the sheet 10 is intermittently conveyed in the sub-scanning direction to form the image on the sheet 10. The sheet 10 having the image thereon is then conveyed to the cutter 27 so that the sheet 10 is cut to a predetermined length by the cutter 27 moving in the main scanning direction Y. Thereafter, the sheet 10 is discharged to the discharge tray, not shown, provided on the front surface of the image forming apparatus 1.

It is to be noted that the image data is not limited to the image of the document read by the image reading unit 2. Alternatively, the image data may be sent from a personal computer or the like communicably connected to the image forming apparatus 1.

As described previously, the sheet roll 4 with the flange members 6 attached to both ends of the paper core 4a is set on the flange bearings 5 from the front of the image forming apparatus 1, through the opening 7 formed between the image reading unit 2 and the image forming unit 3.

A guide assembly 300 is provided at upper and lower parts of the opening 7 toward the flange bearings 5 from the front to the back of the image forming apparatus 1 so as to position at least one of the flange members 6 attached to the sheet roll 4 laterally in the width direction Y, thereby guiding the sheet roll 4 to the flange bearings 5.

Specifically, the guide assembly 300 includes upper guide members 30a, 30b, and 30c (hereinafter collectively referred to as upper guide members 30) and corresponding lower guide members 31a, 31b, and 31c (hereinafter collectively referred to as lower guide members 31). Each of the upper and lower guide members 30 and 31 guides at least one of the flange members 6 attached to the sheet roll 4. The upper guide members 30 are provided in a bottom portion 1a of the image reading unit 2, and the lower guide members 31 are provided in an upper potion 1b of a housing that stores the image forming unit 3. Thus, the bottom portion 1a of the image reading unit 2 forms the upper part of the opening 7, and the upper portion 1b of the image forming unit 3 forms the bottom part of the opening 7. Each of the upper and lower guide members 30 and 31 is continuously formed in a direction of insertion of the sheet roll 4 into the sheet roll storage unit 8 from the opening 7.

The upper and lower guide members 30b and 31b are deployed so as to define a slope tilting downward from the front to the back of the image forming apparatus 1 at the bottom portion 1a of the image reading unit 2 and the upper portion 1b of the image forming unit 3, respectively. Accordingly, the sheet roll 4 that has passed through the upper and lower guide members 30b and 31b formed by the slopes can be slid to the upper and lower guide members 30c and 31c provided at positions lower than the upper and lower guide members 30a and 31a provided at an entrance of the opening 7. As a result, a lower part of the sheet roll 4 is positioned substantially at the same height as the image forming unit 3 in the vertical direction Z as illustrated in FIG. 2 so that an upper part of the sheet roll 4 is positioned below the image reading unit 2, thereby reducing the height of the image forming apparatus 1. Thus, a height at a position to place the document to be read, that is, a height at an upper surface of the document stand 11 in the image reading unit 2, can be reduced, thereby providing easy access to the document stand 11 by the user.

As illustrated in FIG. 2, the image reading unit 2 is disposed behind the carriage 20 included in the image forming unit 3, and the contact image sensor 14 is provided above the upper and lower guide members 30b and 31b, thereby positioning the sheet roll 4 below the image reading unit 2. Because no conveyance means for conveying the document is provided at a bottom portion of the document stand 11 at the front of the image forming apparatus 1, the bottom portion of the document stand 11 can be sculpted so as to smoothly guide the sheet roll 4 to the flange bearings 5 from the opening 7 without obstacles. As a result, the sheet roll 4 can be set smoothly on the flange bearings 5 in the sheet roll storage unit 8 from the opening 7 provided at the height close to the document stand 11.

Figure 4:
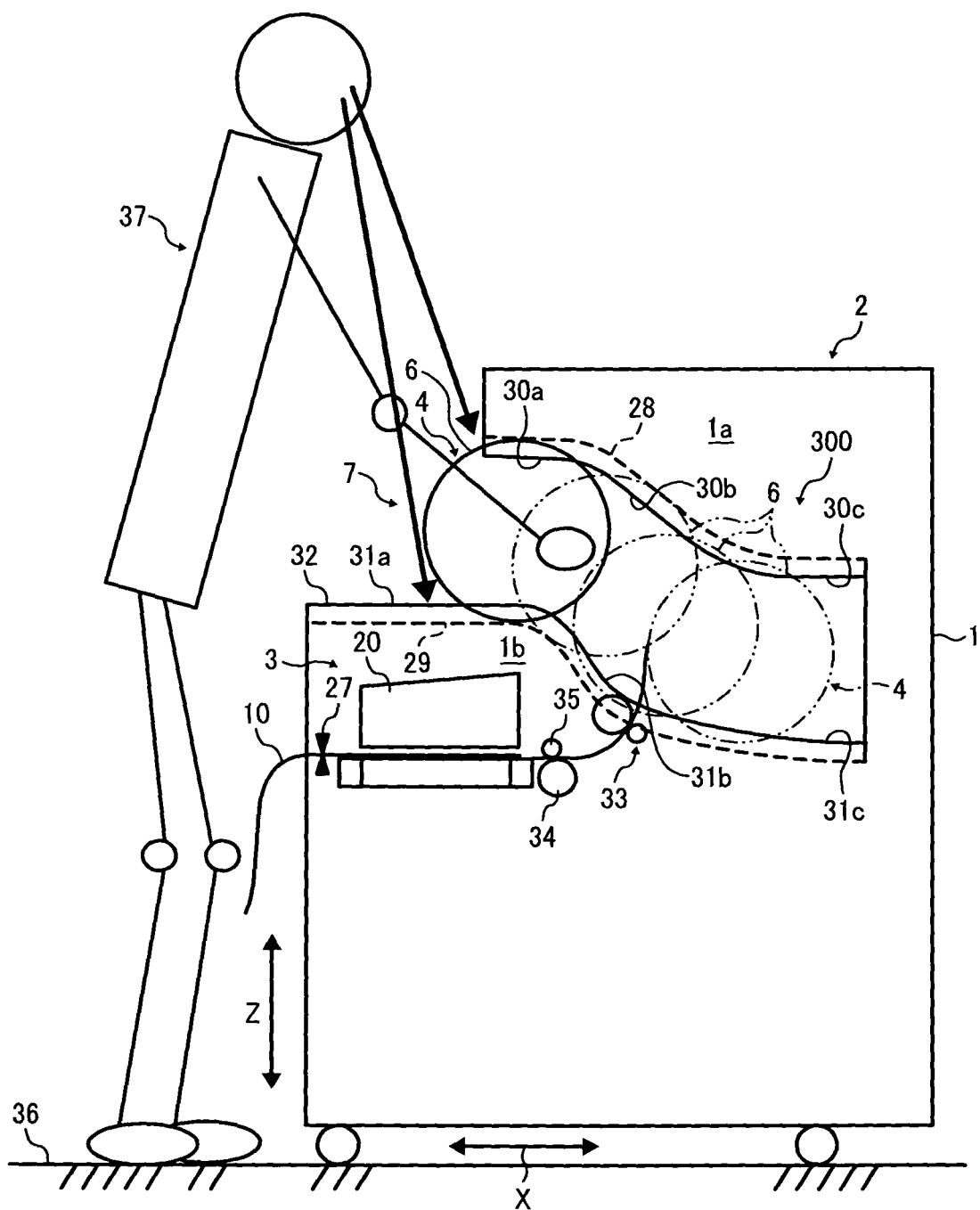
FIG. 4 is a vertical cross-sectional view illustrating setting of the sheet roll in the image forming apparatus through guide members according to the first illustrative embodiment.

In addition, a front edge of the document stand 11 is provided behind a front surface of the housing of the image forming unit 3. Accordingly, before setting the sheet roll 4 on the flange bearings 5, a user 37 shown in FIG. 4 can temporarily place the sheet roll 4 on an upper surface of the housing of the image forming unit 3 serving as a sheet roll stand 32 provided in front of the upper and lower guide members 30a and 31a. Thereafter, the user 37 rotates the sheet roll 4 to the back of the image forming apparatus 1 through the upper and lower guide members 30 and 31 so that the sheet roll 4 to which the flange members 6 are attached is set on the flange bearings 5. The sheet roll stand 32 may have any shape or be made of any material that provides a stable platform, that is, prevents the sheet roll 4 from rotating forward or backward when the user 37 temporarily places the sheet roll 4 thereon. (It is to be noted that, in FIG. 4, reference numeral 36 denotes a floor on which the image forming apparatus 1 is installed.)

Figure 5:
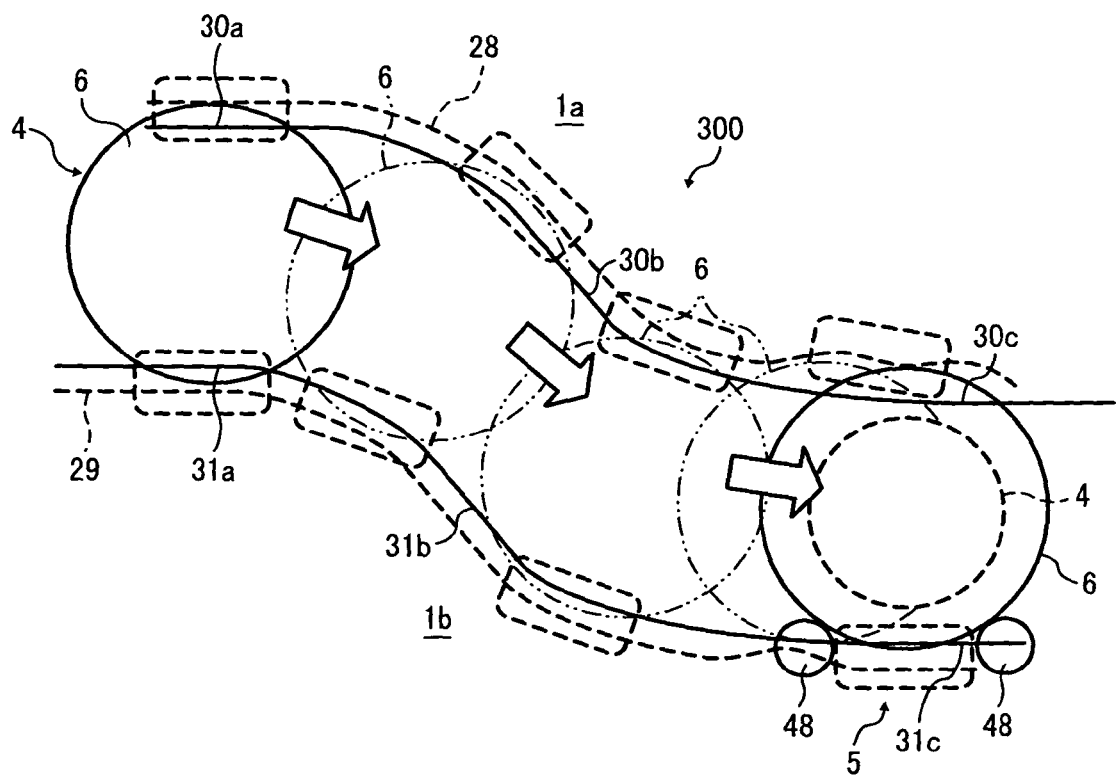
FIG. 5 is an enlarged vertical cross-sectional view illustrating a path of the sheet roll being set in the image forming apparatus through the guide members illustrated in FIG. 4.

As described above, each of the upper and lower guide members 30 and 31 provided in the upper and lower parts of the opening 7, respectively, is continuously formed in the direction of insertion of the sheet roll 4 indicated by arrows in FIG. 5. The upper and lower guide members 30 and 31 have concavities 28 and 29, respectively, at rectangular ranges encompassed by dotted lines in FIG. 5, that is, restriction ranges at where the flange members 6 are positioned relative to the image forming apparatus 1. Each of the concavities 28 and 29 engages convex outer circumferences of the flange members 6 when the flange members 6 attached to the sheet roll 4 pass through the restriction ranges, thereby positioning the flange members 6. As a result, the flange members 6 attached to the sheet roll 4 are more easily guided to the flange bearings 5 so that setting of the sheet roll 4 on the flange bearings 5 in the sheet roll storage unit 8 is facilitated.

Thus, the guide assembly 300 includes the upper and lower guide members 30 and 31, and the concavities 28 and 29 formed in the upper and lower guide members 30 and 31, respectively.

Figure 6A:
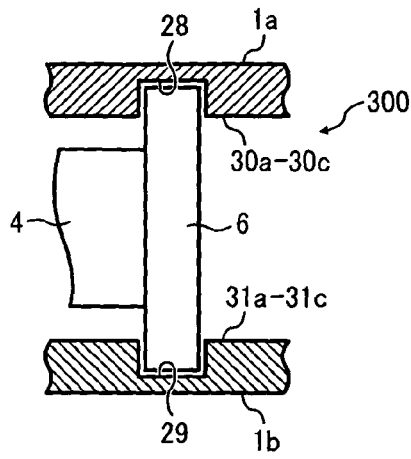
FIGS. 6A to 6E are vertical cross-sectional views respectively illustrating examples of engagement of the flange member and the guide members according to the first illustrative embodiment.

A description is now given of engagement of the flange members 6 and the upper and lower guide members 30 and 31. FIGS. 6A to 6E are vertical cross-sectional views respectively illustrating examples of engagement of the flange member 6 and the upper and lower guide members 30 and 31. FIG. 6A is the most common example of engagement of the flange member 6 and the concavities 28 and 29 respectively formed in the upper and lower guide members 30 and 31 according to this patent specification.

Figure 6B:
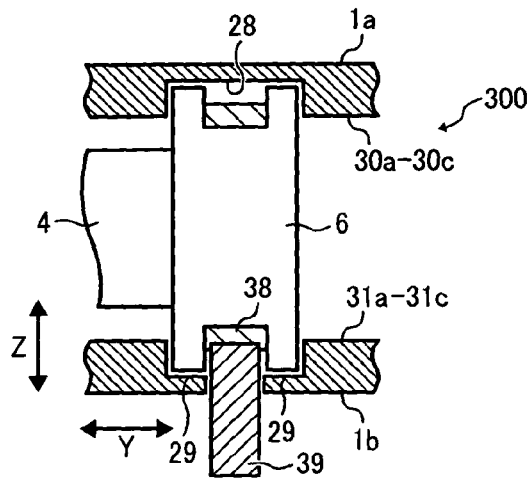

In the example illustrated in FIG. 6B, a width of each of the concavities 28 and 29 are increased in the width direction Y, and a width of the flange member 6 is also increased in the width direction Y corresponding to the increased width of each of the concavities 28 and 29, thereby reliably positioning the flange member 6 attached to the sheet roll 4 in the width direction Y. Further, a helical gear 38 is provided at a recessed portion formed at the center of the flange member 6 in the width direction Y to engage a drive gear 39 provided to the image forming apparatus 1, so that a drive force is transmitted from the drive gear 39. Although engagement of the helical gear 38 and the drive gear 39 causes a force acting on the helical gear 38 fixed to the flange member 6 in a thrust direction, that is, the width direction Y, engagement of the flange member 6 and the concavities 28 and 29 can restrict movement of the helical gear 38 in the width direction Y.

Figure 6C:
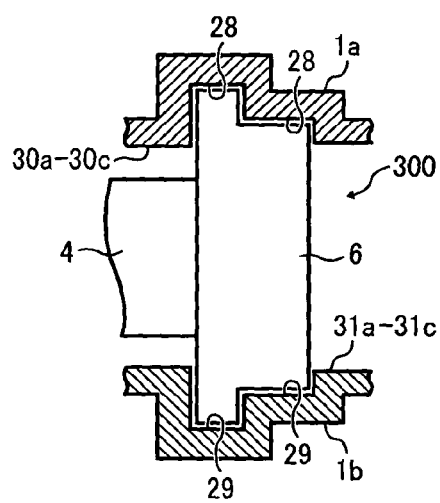
Figure 6D:
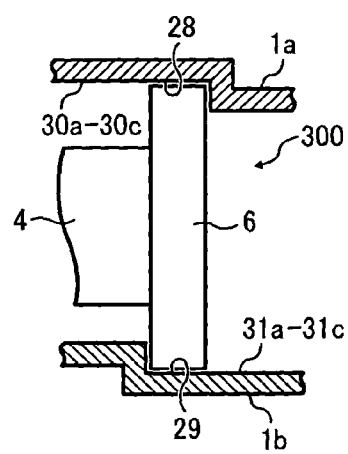
Figure 6E:
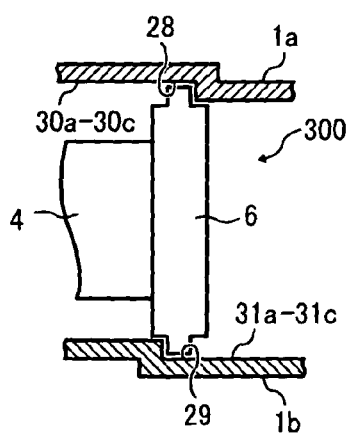

In the example illustrated in FIG. 6C, each of the concavities 28 and 29 and portions of the flange member 6 respectively engaging the concavities 28 and 29 are stepped in the same direction. By contrast, in the example illustrated in FIG. 6D, the concavities 28 and 29 are stepped in different directions to engage the flange member 6. The example illustrated in FIG. 6E is a variation of the example illustrated in FIG. 6D. Compared to the example illustrated in FIG. 6D, the example illustrated in FIG. 6E has a protrusion at the center of the outer circumference of the flange member 6.

FIGS. 7A to 7D are vertical cross-sectional views respectively illustrating other examples of engagement of the flange member 6 and the upper and lower guide members 30 and 31. Compared to the examples shown in FIGS. 6A to 6E, relation of engagement of the flange member 6 and the upper and lower guide members 30 and 31 is reversed in the examples shown in FIGS. 7A to 7D. Specifically, when the flange member 6 has a concavity, each of the upper and lower guide members 30 and 31 has either a convexity that engages the flange member 6 or a shape to encompass the flange member 6.

Figure 7A:
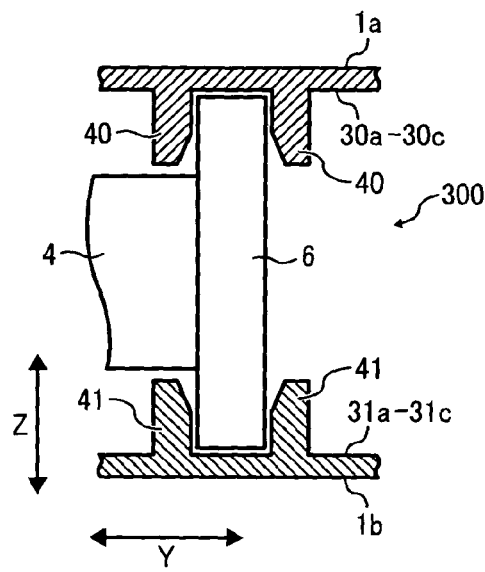
FIGS. 7A to 7D are vertical cross-sectional views respectively illustrating other examples of engagement of the flange member and the guide members according to the first illustrative embodiment.

FIG. 7A shows an example in which a pair of upper ribs 40 protruding downward from the bottom portion 1a of the image reading unit 2 and a pair of lower ribs 41 protruding upward from the upper portion 1b of the image forming unit 3 are formed in the width direction Y to sandwich the flange member 6 therebetween. In this specification, the pairs of upper and lower ribs 40 and 41 described above are also regarded as an example of a convexity. A tapered surface is formed at an inner portion at a leading edge of each of the pairs of upper and lower ribs 40 and 41 which contacts the outer circumference of the flange member 6 to facilitate engagement of the flange member 6 and the pairs of the upper and lower ribs 40 and 41.

Figure 7B:
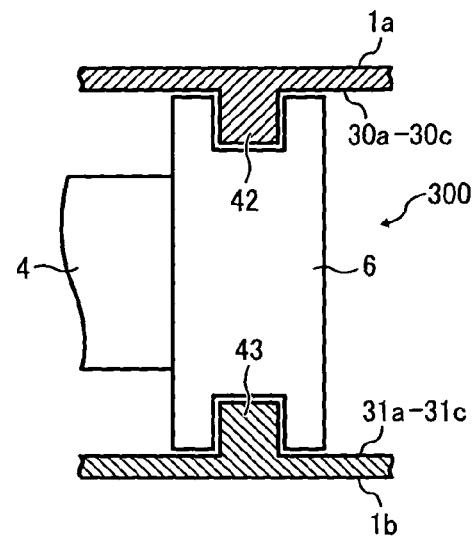
Figure 7C:
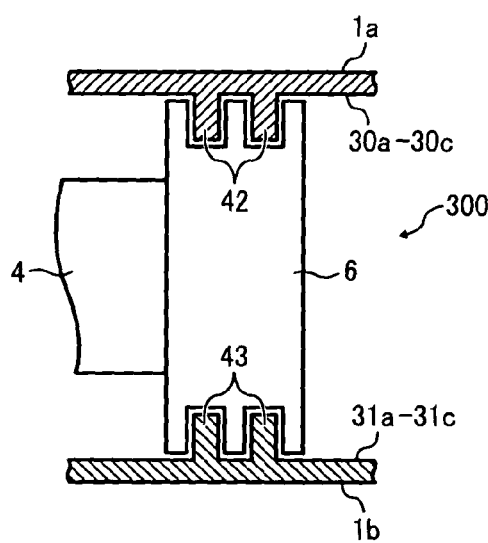

In the example shown in FIG. 7B, upper and lower convexities 42 and 43 are respectively formed in the upper and lower guide members 30 and 31 to engage the concavity formed in the flange member 6. The example shown in FIG. 7C is a variation of the example shown in FIG. 7B. Compared to the FIG. 7B, in FIG. 7 the upper and lower convexities 42 and 43 are respectively formed in the upper and lower guide members 30 and 31 at two positions in the width direction Y to engage the concavities formed in the flange member 6, respectively.

Figure 7D:
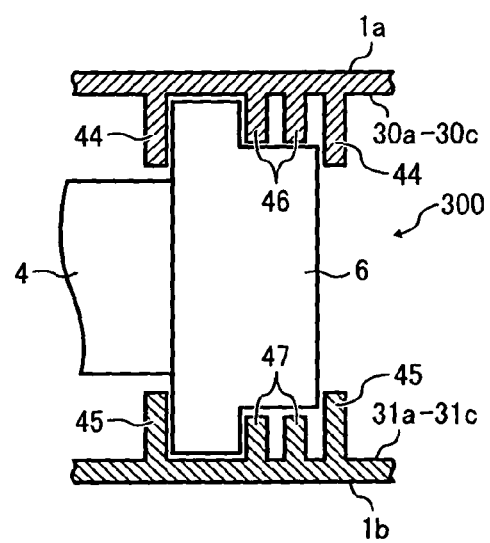

The example shown in FIG. 7D is a variation of the example shown in FIG. 7A. Compared to the example shown in FIG. 7A, the outer circumference of the flange member 6 in FIG. 7D is stepped. In place of the upper and lower pairs of ribs 40 and 41, pairs of upper and lower ribs 44 and 45 are respectively formed in the upper and lower guide members 30 and 31 to sandwich the flange member 6 therebetween. Further, the stepped portion of the flange member 6 is positioned in the vertical direction Z by a leading-edge surface of each of multiple upper and lower ribs 46 and 47 formed between each of the pairs of upper and lower ribs 44 and 45, respectively.

It is to be noted that engagement of the flange member 6 and the upper and lower guide members 30 and 31 is not limited to the examples shown in FIGS. 6A to 6E, and may be varied depending on the desired accuracy in positioning of the flange member 6 and the desired function of guiding the flange member 6. Similarly, engagement of the flange member 6 and the upper and lower guide members 30 and 31 is not limited to the examples shown in FIGS. 7A to 7D, and may be varied depending on the desired accuracy in positioning of the flange member 6 and the desired function of guiding the flange member 6.

Further alternatively, the guide assembly 300 dedicated to guiding of the flange member 6 need not be provided in the examples shown in FIGS. 6 and 7. Instead, other components formed of, for example, a resin having a shape for positioning and guiding the flange member 6 may be provided to the bottom portion 1a of the image reading unit 2 and the upper portion 1b of the image forming unit 3, respectively. As a result, accumulation of tolerances of the components can be reduced, thereby more accurately positioning and guiding the sheet roll 4 to the flange bearings 5.

A gap in engagement between the flange member 6 and the upper and lower guide members 30 and 31 in the width direction Y and the vertical direction Z may be set depending on the desired accuracy of positioning of the flange member 6. For example, the gap in engagement between the flange member 6 and each of the upper and lower guide members 30a and 31a provided near the entrance of the opening 7 is set larger in order to more reliably guide the flange member 6. The gap is gradually decreased approaching the flange bearings 5 in order to more accurately position the flange member 6 in the width direction Y.

A description is now given of operations performed by the user 37 to set the sheet roll 4 on the flange bearings 5. Before inserting the sheet roll 4 into the opening 7, the user 37 temporarily places the sheet roll 4 to which the flange members 6 are attached on the sheet roll stand 32 as needed. Next, the user 37 engages at least one of the flange members 6 attached to the sheet roll 4 with the upper and lower guide members 30 and 31, and then rotates the sheet roll 4 to the back of the image forming apparatus 1. Accordingly, at least one of the flange members 6 is reliably positioned on the flange bearings 5 so that the sheet roll 4 is appropriately set on the flange bearings 5 disposed on the back of the image forming apparatus 1. When placed on the flange bearings 5, the flange members 6 attached to the sheet roll 4 contact the support rollers 48 provided to the flange bearings 5. As a result, the flange members 6 are rotated by the support rollers 48 to feed the sheet 10 from the sheet roll 4.

Thus, even when a view is blocked by the image reading unit 2 provided at the top of the image forming apparatus 1, the user 37 can accurately position the sheet roll 4 on the flange bearings 5.

Figure 8:
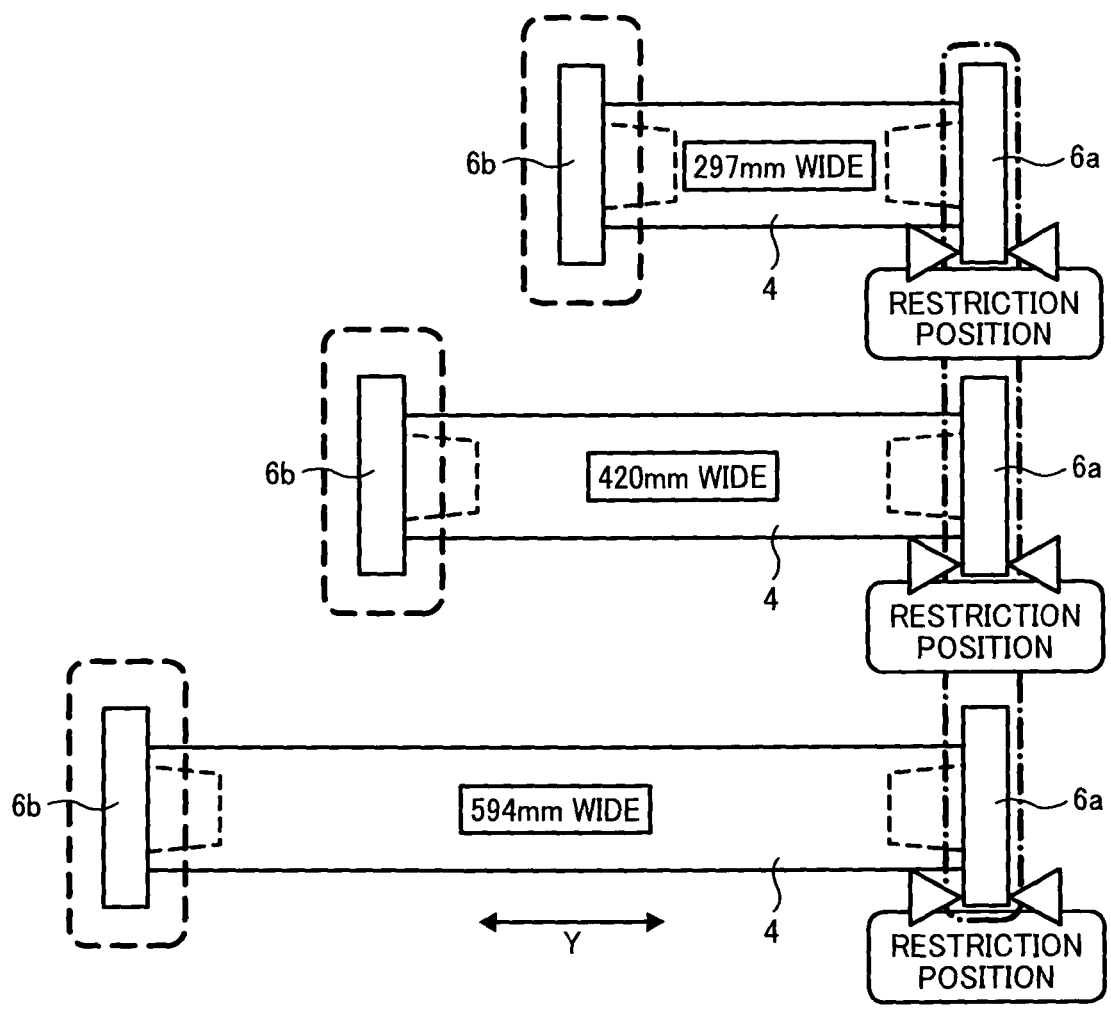
FIG. 8 is a schematic view illustrating an example of a configuration of a flange-type sheet roll feed system using a sheet roll having different sizes according to a first variation of the first illustrative embodiment.

A description is now given of a first variation of the first illustrative embodiment with reference to FIG. 8. FIG. 8 is a schematic view illustrating the configuration of the flange-type sheet roll feed system using the sheet roll 4 having different sizes according to the first variation of the first illustrative embodiment. One difference from the first illustrative embodiment is that the sheet 10 fed from the sheet roll 4 is conveyed with the one end of the sheet roll 4 in the width direction Y set as a conveyance reference. Another difference is that one of the flange members 6 attached to the sheet roll 4 (hereinafter referred to as flange member 6a) is fixed by the guide assembly 300 at a conveyance reference position in the width direction Y while a position of the other one of the flange members 6 (hereinafter referred to as a flange member 6b) is variable depending on the size of the sheet roll 4 in the width direction Y. The rest of the configuration of the first variation is the same as that of the first illustrative embodiment.

Specifically, as illustrated in FIG. 8, the position of the flange member 6a is not changed in the width direction Y even when, for example, three types of the sheet roll 4 each having the different sizes are used. Accordingly, provision of the fixed flange member 6a in the width direction Y and the guide assembly 300 provided to the image forming apparatus 1 corresponding to the flange member 6a can facilitate setting of the sheet roll 4.

Because the position of the flange member 6b attached to the other end of the sheet roll 4 is variable in the width direction Y depending on the size of the sheet roll 4, the guide assembly 300 having the fixed position in the width direction Y cannot be provided to the image forming apparatus 1. It is to be noted that, a position of the flange bearing 5 on which the flange member 6a is fixed is also fixed in the width direction Y while the flange bearing 5 on which the flange member 6b is set is movable in the width direction Y depending on the size of the sheet roll 4. With the above-described configuration, the same effects as those obtained by the first illustrative embodiment can be achieved by the first variation of the first illustrative embodiment.

A description is now given of a second variation of the first illustrative embodiment. In place of the flange-type sheet roll feed system, the spool-type sheet roll feed system is used in the second variation. The rest of the configuration of the second variation is the same as that of the first variation.

Figure 9A:
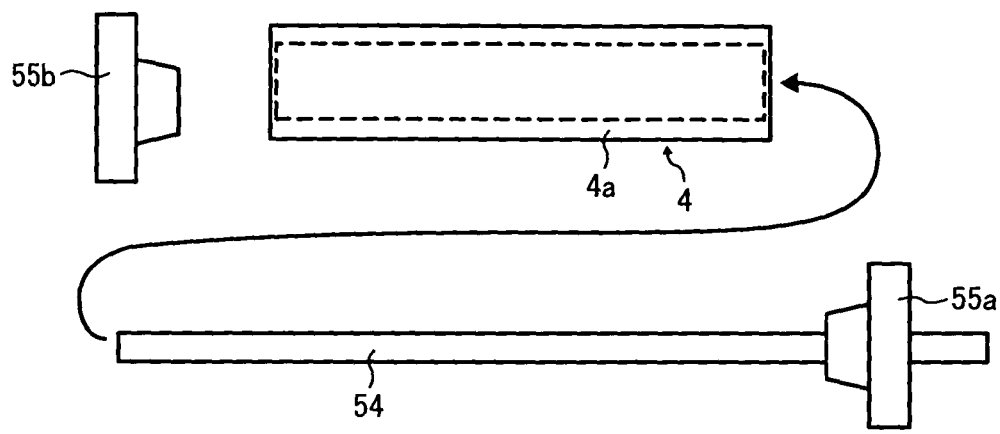
FIGS. 9A to 9C are schematic views illustrating procedures for setting a sheet roll in a spool-type sheet roll feed system according to a second variation of the first illustrative embodiment.
Figure 9B:
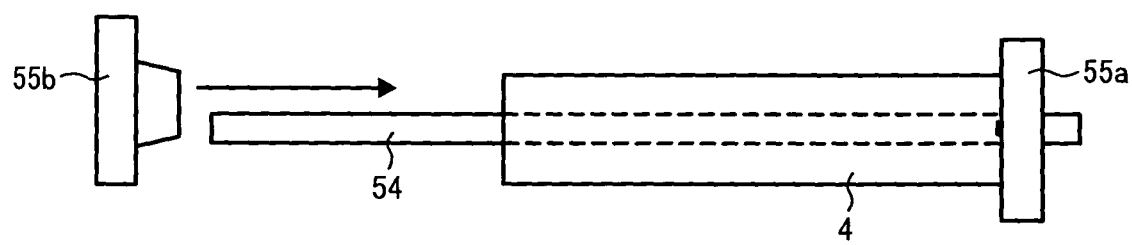
Figure 9C:
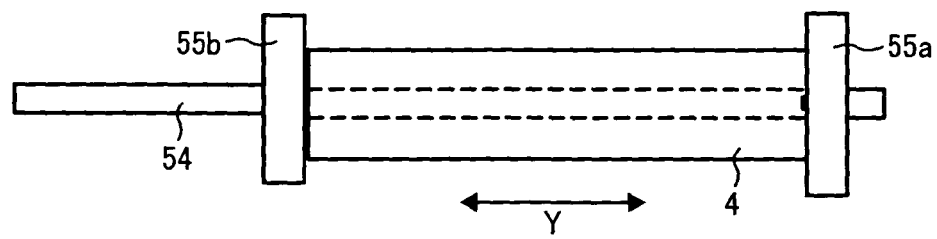

The procedure for setting the sheet roll 4 in the spool-type sheet roll feed system is described below. FIGS. 9A to 9C are schematic views illustrating the procedures for setting the sheet roll 4 in the spool-type sheet roll feed system.

First, a spool shaft 54 to which a spool flange 55a is fixed is inserted from one end of the paper core 4a of the sheet roll 4 as illustrated in FIG. 9A. Next, the spool flange 55a is attached to the one end of the sheet roll 4 through the spool shaft 54, and a spool flange 55b is attached to the other end of the paper core 4a of the sheet roll 4 as illustrated in FIG. 9B. Thereafter, the sheet roll 4 with the spool flanges 55a and 55b attached as illustrated in FIG. 9C is set on a sheet roll supporter. Compared to the flange-type sheet roll feed system, the additional operation of inserting the spool shaft 54 into the paper core 4a of the sheet roll 4 is needed in the spool-type sheet roll feed system, thereby slightly increasing user's operation upon replacement of the sheet roll 4.

Figure 10:
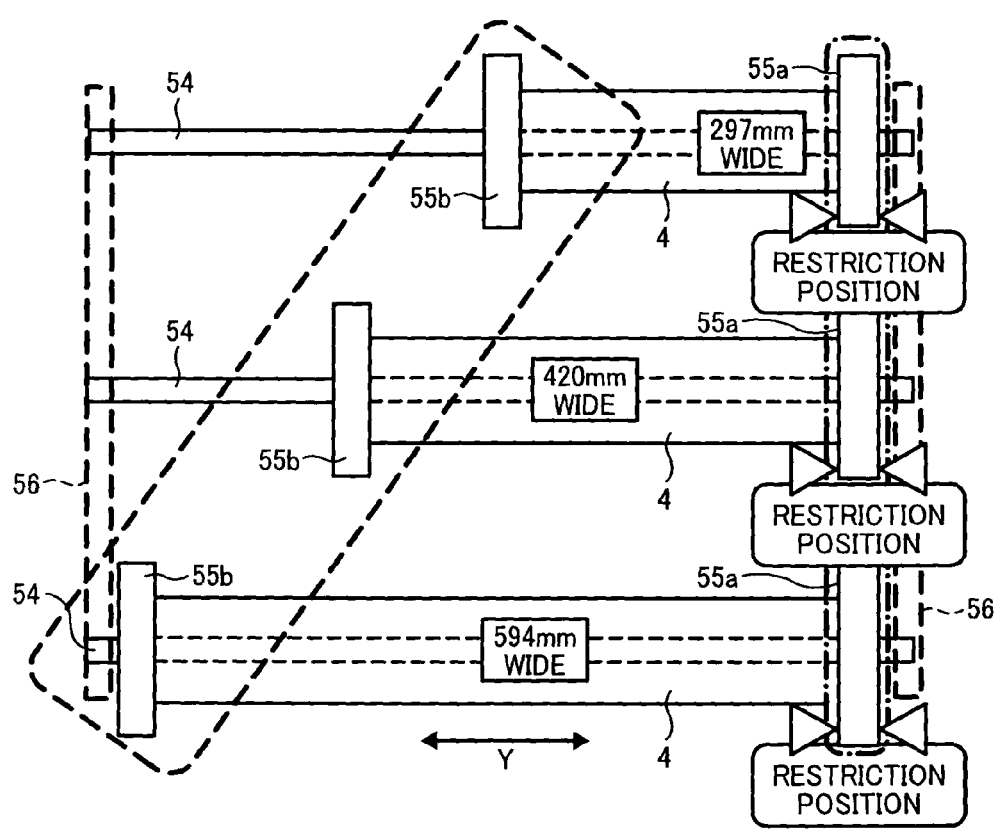
FIG. 10 is a schematic view illustrating an example of a configuration of the spool-type sheet roll feed system using a sheet roll having different sizes according to the second variation of the first illustrative embodiment.

FIG. 10 is a schematic view illustrating an example of a configuration of the spool-type sheet roll feed system using the sheet roll 4 having different sizes according to the second variation of the first illustrative embodiment. Similar to the first variation described above, the sheet 10 fed from the sheet roll 4 is conveyed with the one end of the sheet roll 4 in the width direction Y set as a conveyance reference according to the second variation. Therefore, the position of the spool flange 55a set as the conveyance reference is not changed in the width direction Y even when various types of the sheet roll 4 having the different sizes are used. Accordingly, provision of the spool flange 55a and the guide assembly 300 provided to the image forming apparatus 1 corresponding to the spool flange 55a can facilitate setting of the sheet roll 4.

A length of the spool shaft 54 is longer than the maximum width of the sheet roll 4 used in the image forming apparatus 1. Both ends of the spool shaft 54 are fitted into cutouts 56 serving as sheet roll supporters provided to the image forming apparatus 1 so that the sheet roll 4 is securely set therein. Because the spool flange 55a is fixedly mounted to the spool shaft 54, relative positions of the spool shaft 54 and the spool flange 55a are fixed, thereby more reliably positioning the sheet roll 4 relative to the image forming apparatus 1 in an axial direction of the sheet roll 4.

Because the position of the spool flange 55b attached to the other end of the sheet roll 4 is variable in the width direction Y depending on the size of the sheet roll 4 through the spool shaft 54, the guide assembly 300 having the fixed position in the width direction Y cannot be provided to the image forming apparatus 1. It is to be noted that the main difference from the flange-type sheet roll feed system is that the positions of the cutouts 56 on which the both ends of the spool shaft 54 are respectively placed are not changed even when the sheet roll 4 having a different size is used. Thus, the same effects as those obtained by the first illustrative embodiment can be achieved by the second variation of the first illustrative embodiment.

Figure 11:
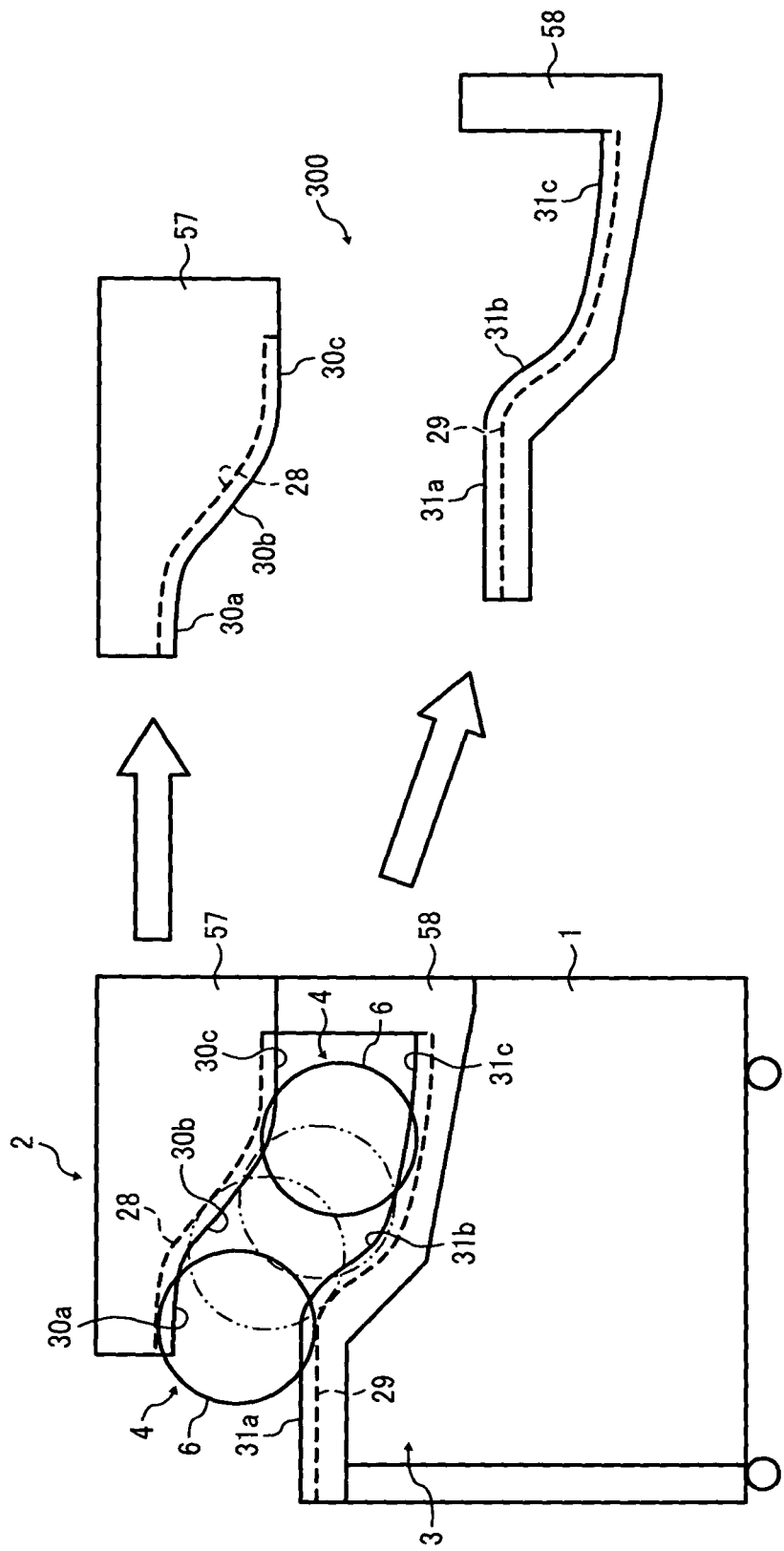
FIG. 11 is a vertical cross-sectional view illustrating an example of a configuration of an image forming apparatus according to a third variation of the first illustrative embodiment.

A description is now given of a third variation of the first illustrative embodiment with reference to FIG. 11. FIG. 11 is a vertical cross-sectional view illustrating an example of a configuration of the image forming apparatus 1 according to the third variation of the first illustrative embodiment. The differences from the first illustrative embodiment are that covers 57 and 58 detachably attachable to the image forming apparatus 1 are provided to the image forming apparatus 1 as external components, and the upper guide members 30 and the concavity 28 are provided to the cover 57 while the lower guide members 31 and the concavity 29 are provided to the cover 58. The rest of the configuration of the third variation is the same as that of the first illustrative embodiment.

The covers 57 and 58 may be formed together as a single integrated unit. In such a case, the upper and lower guide members 30 and 31 and the concavities 28 and 29 may be provided to the integrated cover.

Figure 12:
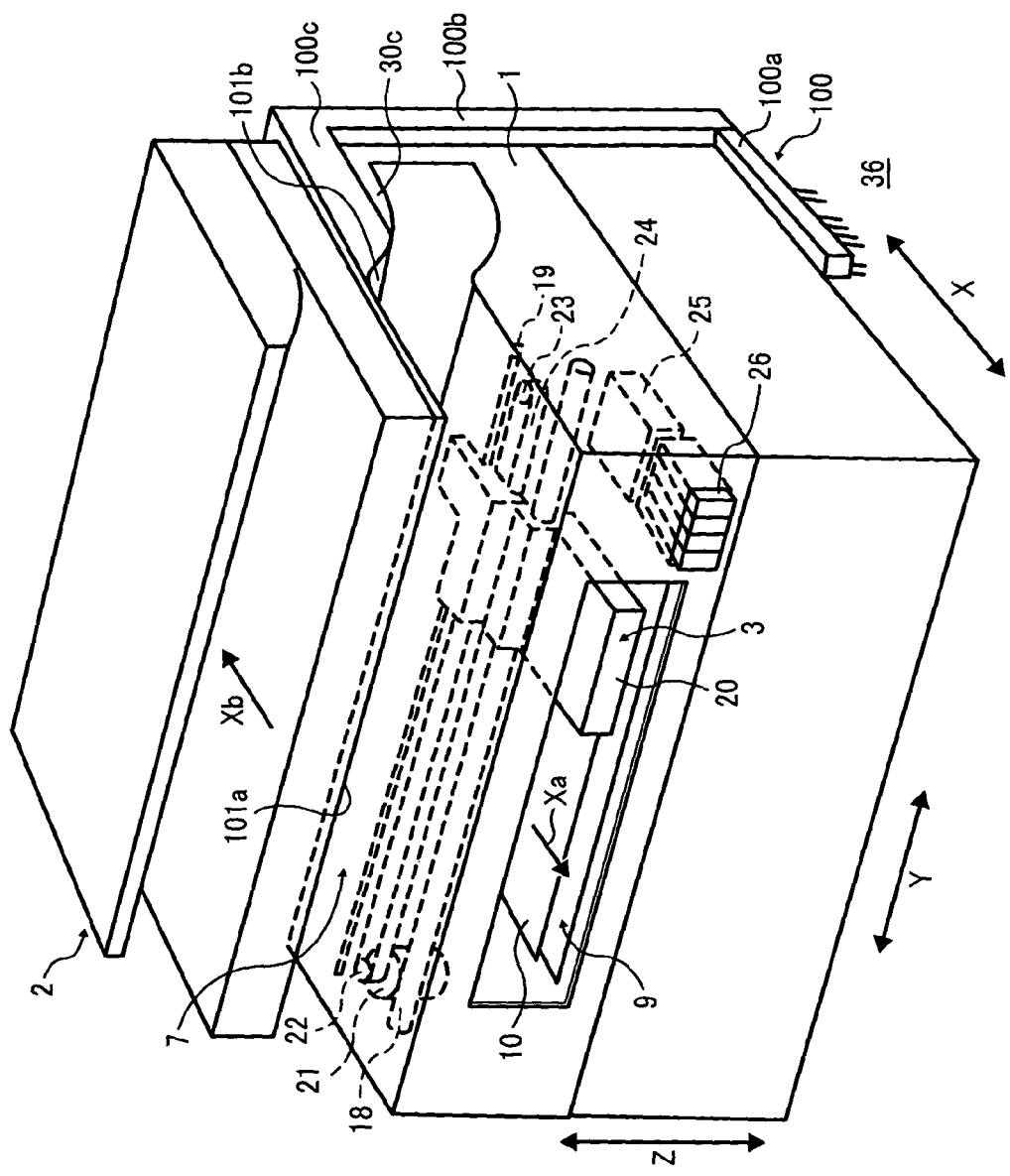
FIG. 12 is a perspective view illustrating an example of a configuration of an image forming apparatus according to a fourth variation of the first illustrative embodiment.

A description is now given of a fourth variation of the first illustrative embodiment with reference to FIG. 12. FIG. 12 is a perspective view illustrating an example of a configuration of the image forming apparatus 1 according to the fourth variation of the first illustrative embodiment.

Although the image reading unit 2 and the image forming unit 3 are formed together as the image forming apparatus 1 according to the first illustrative embodiment as illustrated in FIG. 1, the configuration of the image forming apparatus 1 is not limited thereto. For example, alternatively, the image reading unit 2 may be disposed on a stand assembly 100 while the image forming unit 3 may be accommodated within the stand assembly 100 as illustrated in FIG. 12. The rest of the configuration of the fourth variation is the same as that of the first illustrative embodiment.

The stand assembly 100 includes a base 100a extending from the back to the front of the image forming apparatus 1 to contact the floor 36, a stand 100b standing upward from the base 100a, and a storage unit 100c extending to the front from the stand 100b and having a surface on which the image rereading unit 2 is placed.

Although not shown in FIG. 12, a sheet roll is set in the image forming apparatus 1 from the front to the back of the image forming apparatus 1. The upper guide member 30c that guides the sheet roll to the sheet roll supporter is provided on the back of the image forming apparatus 1. However, no member corresponding to the lower guide members 31 of the first illustrative embodiment is provided at the upper portion of the image forming unit 3.

In order to guide the sheet roll to the upper guide member 30c, guide members 101a and 101b respectively corresponding to the upper guide members 30a and 30b of the guide assembly 300 according to the first illustrative embodiment are provided to the storage unit 100c. The examples of engagement shown in FIGS. 6 and 7 are applicable to the fourth variation.

The configuration of the fourth variation facilitates setting of the sheet roll from the front to the back of the stand-type image forming apparatus 1 described above. It is to be noted that, because an upper front portion of the image forming apparatus 1 is assumed to be used for the image forming unit 3, guide members that guide a lower portion of the flange members 6 may not be provided. In such a case, guide members that guide lower ends of the flange members 6 are fixed to and covered with an upper surface of the image forming unit 3 so that the sheet roll 4 is guided to the sheet roll supporter while positioning the flange members 6 in the vertical direction Z using engagement shown in FIGS. 6 and 7.

It is to be noted that illustrative embodiments of the present invention are not limited to those described above, and various modifications and improvements are possible without departing from the scope of the present invention. It is therefore to be understood that, within the scope of the associated claims, illustrative embodiments may be practiced otherwise than as specifically described herein. For example, elements and/or features of different illustrative embodiments may be combined with each other and/or substituted for each other within the scope of the illustrative embodiments.

The image reading unit 2, the image forming unit 3, and the flange bearings 5 are not limited to the examples described above, and alternatively, well-known components same as the above-described examples may be used. For example, the image forming unit 3 is not limited to a serial-type inkjet recording device. Alternatively, a line-type inkjet recording device, an image forming device employing an electrophotographic method, or a device having two or more of the functions of the serial-type inkjet recording device, the line type inkjet recording device, and the image forming device employing the electrophotographic method may be used as the image forming unit 3. In addition, the image forming apparatus 1 may include an operation panel serving as an operation unit at the top on the front thereof in addition to the image reading unit 2. Further, the image reading unit 2 may not be provided to the image forming apparatus 1. In such a case, for example, the image forming apparatus 1 forms images based on data externally input from a computer or the like or data recorded in storage media such as compact disks.

What is claimed is:

1. An image forming apparatus, comprising:
   an image reading unit disposed in an upper portion of the image forming apparatus to read an image of a document;
   an image forming unit disposed below the image reading unit to form the image on a sheet fed from a sheet roll formed of a single continuous sheet;
   a pair of flange members attached to both lateral ends of the sheet roll in a width direction of the sheet roll perpendicular to a direction in which the sheet is fed from the sheet roll to the image forming unit;
   a sheet roll supporter disposed below the image reading unit in a rear portion of the image forming apparatus, the sheet roll supporter supporting the sheet roll to feed the sheet from the sheet roll to the image forming unit;
   an opening formed in a front portion of the image forming apparatus between the image reading unit and the image forming unit, through which the sheet roll with the pair of flange members attached is set to the sheet roll supporter; and
   a guide assembly provided at upper and lower parts of the opening, the guide assembly positioning at least one of the pair of flange members attached to the sheet roll in the width direction to guide the sheet roll from the opening to the sheet roll supporter.

2. The image forming apparatus according to claim 1, wherein the guide assembly forms a single continuous unit along a direction in which the sheet roll is set to the sheet roll supporter.

3. The image forming apparatus according to claim 1, wherein the guide assembly has a convexity that engages the at least one of the pair of flange members having a concavity.

4. The image forming apparatus according to claim 1, wherein the guide assembly has a concavity that engages the at least one of the pair of flange members having a convexity.

5. The image forming apparatus according to claim 1, wherein the guide assembly is provided to an external component detachably attachable to the image forming apparatus.

6. The image forming apparatus according to claim 1, wherein one of the pair of flange members attached to the lateral ends of the sheet roll is fixed at a fixed reference position in the width direction by the guide assembly, to convey the sheet fed from the sheet roll with the one lateral end of the sheet roll fixed in the width direction being used as a conveyance reference by the one of the pair of flange members.

7. The image forming apparatus according to claim 1, wherein:
   the image forming unit comprises a carriage laterally movable in the width direction;
   the guide assembly has a sloped portion tilting downward from the opening to the sheet roll supporter; and
   the image reading unit is disposed distal of the carriage and further comprises an image reader disposed above the sloped portion.

8. The image forming apparatus according to claim 1, wherein the image reading unit further comprises a document stand disposed in the front portion of the image forming apparatus, a front edge of the document stand disposed distal of a front surface of the image forming unit,
   the image forming apparatus further comprising a sheet roll stand provided on an upper surface of the image forming unit between the front edge of the document stand and the image forming unit, and proximal of the guide assembly.

9. The image forming apparatus according to claim 1, wherein the guide assembly comprises corresponding sets of upper and lower concavities formed in the image reading unit and the image forming unit, respectively, each dimensioned to accommodate a respective one of the flange members.

10. The image forming apparatus according to claim 1, wherein the sheet roll with the pair of flange members attached thereto is set to the sheet roll supporter in a state in which the sheet roll supporter is positioned in the rear portion of the image forming apparatus.

11. The image forming apparatus according to claim 1, wherein the sheet roll supporter is provided within the opening in the rear portion of the image forming apparatus, and
   the guide assembly is provided at the upper and lower parts of the opening from a front of the opening toward the sheet roll supporter.

12. The image forming apparatus according to claim 1, wherein the guide assembly is provided at the upper and lower parts of the opening toward the sheet roll supporter from a front to the rear of the image forming apparatus so as to position at least one of the pair of flange members attached to the sheet roll laterally in the width direction, thereby guiding the sheet roll to the sheet roll supporter.

13. The image forming apparatus according to claim 1, wherein the guide assembly includes upper guide members and lower guide members.

14. The image forming apparatus according to claim 13, wherein
the upper guide members are provided in a bottom portion of the image reading unit, and
the lower guide members are provided in an upper portion of the a housing that stores the image forming unit.

15. The image forming apparatus according to claim 1, wherein a lower part of the sheet roll is positioned substantially at a same height as the image forming unit in a vertical direction so that an upper part of the sheet roll is positioned below the image reading unit.

16. The image forming apparatus according to claim 1, wherein the guide assembly has a plurality of convexities that engages the at least one of the pair of flange members having a plurality of concavities.

17. The image forming apparatus according to claim 1, wherein the guide assembly has a plurality of concavities that engages the at least one of the pair of flange members having a plurality of convexities.

18. The image forming apparatus according to claim 1, further comprising a helical gear provide at a recessed portion formed at a center of the at least one of the pair of flange members in a width direction to engage a drive gear provided to the image forming apparatus, so that a drive force is transmitted from the drive gear.

19. The image forming apparatus according to claim 1, further comprising support rollers in the guide assembly, wherein when placed on the sheet roll supporter, the at least one of the pair of flange members attached to the sheet roll contact the support rollers provided to the sheet roll supporter.

20. An image forming apparatus, comprising:
a stand;
an image reading unit disposed on the stand to read an image of a document;
an image forming unit disposed below the stand to form the image on a sheet fed from a sheet roll formed of a single continuous sheet;
a pair of flange members attached to both lateral ends of the sheet roll in a width direction of the sheet roll perpendicular to a direction in which the sheet is fed from the sheet roll to the image forming unit;
a sheet roll supporter disposed below the image reading unit in a rear portion of the image forming apparatus, the sheet roll supporter supporting the sheet roll to feed the sheet from the sheet roll to the image forming unit;
an opening formed in a front portion of the image forming apparatus between the stand and the image forming unit, through which the sheet roll with the pair of flange members attached is set to the sheet roll supporter; and
a guide assembly provided to the stand to position at least one of the pair of flange members attached to the sheet roll in the width direction to guide the sheet roll from the opening to the sheet roll supporter.

* * * * *